MINIATURE SLIP RING AND BRUSH ASSEMBLY
Filed Oct. 17, 1955
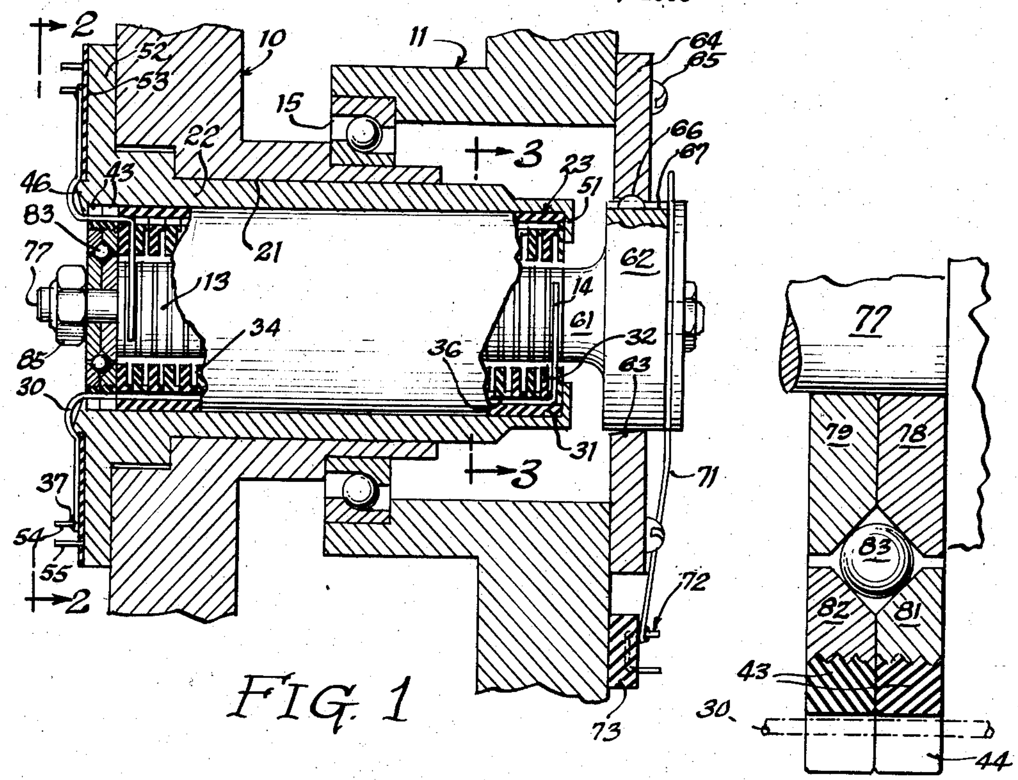
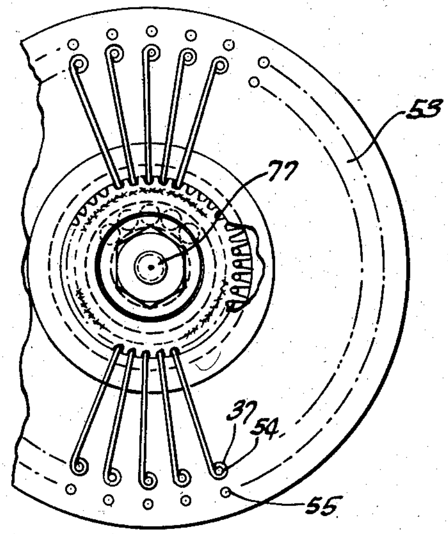
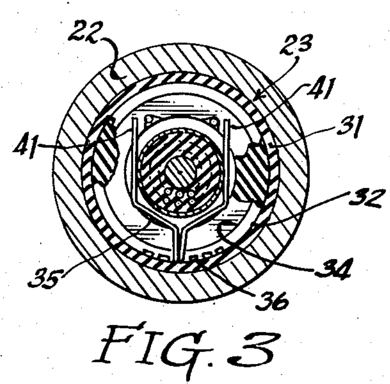
INVENTOR.
Leonard C. Blanding
BY
Attorney United States Patent Office 2,874,362

Patented Feb. 17, 1959

1

2,874,362

MINIATURE SLIP RING AND BRUSH ASSEMBLY

Leonard C. Blanding, Grand Rapids, Mich., assignor to Lear, Incorporated, Grand Rapids, Mich., a corporation of Illinois Application October 17, 1955, Serial No. 540,762

1 Claim. (Cl. 339—5)

This invention relates to a slip ring and brush assembly designed for use where available space is extremely limited or where friction losses must be kept to an irreducible minmum.

The invention has particular value in connection with various types of instruments where the physical dimensions limit the space available for inclusion of means for conducting current between two relatively rotatable members. For example, in gyroscopic instruments it is necessary to provide means such as a synchronous transmitter to translate the mechanical position of a gimbal relative to some reference into an electrical voltage which activates a synchronous receiver at some remote point. Sometimes, in such instruments, torquing motors are used for inducing precession. Additionally, current supply to the rotor motor must be furnished. These and other electrical connections through relatively rotatable connections such as the gimbal trunnions, are made through slip rings and brushes installed adjacent the trunnions. However, where space is at a premium, as is the case with virtually all present day gyroscopic instruments, it is desirable to mount the slip ring and brush assembly within a hollow portion of a gimbal journal. Furthermore, since the mechanical friction between the brushes and slip rings can contribute materially by way of unwanted precessive torque it also becomes desirable to minimize such friction to the greatest practical degree. As an indication of an environment in which the instant invention has been embodied, and to contrast its features with slip-ring and brush assemblies in the commonly-accepted sense it may be noted that the invention assembly has been carried into practice with a slip ring arbor and rings of 0.180" diameter and an outside diameter of brush holder of 0.478". In length 30 rings and brushes have occupied a space of approximately 1.108".

Inasmuch as the rings are positioned axially at a distance of 0.030" apart it is of the utmost importance that end play between the rings and brushes be virtually zero; otherwise a brush can move out of contact with its individual ring or a brush may short-circuit a pair of adjacent rings or vice versa. Such misregistration can occur as a result of temperature change or failure to provide suitable bearings which will assure freedom from end play without danger of "freezing" due to the minute clearances which must prevail.

In my co-pending application, Serial Number 389,662, filed November 2, 1953, I have disclosed a slip ring and brush assembly having some features in common with the present subject matter but not possessing all of the advantages thereof. The present application has to do with improvements in the concept previously disclosed.

The principal object of the present invention is to provide a miniature slip ring and brush assembly in which the alignment of a brush with its associated slip ring is maintained safely and reliably notwithstanding forces tending to alter such alignment arising from thermal expansion and mechanical displacement.

Another object is to provide in a slip ring and brush

2 assembly of the character here contemplated means for assuring concentricity of the slip ring arbor with respect to the brush holder and brushes.

A further object is to provide means for supporting a miniature slip ring assembly on its framework in a manner assuring concentricity with the axis of rotation but allowing limited axial movement.

An additional object is to provide a novel form of bearing capable of being assembled with the arbor and the support therefor in the particular assembly dictated by the nature of the invention whereby a simple yet reliable anti-friction support having close running limits both radially and axially is assured.

Other objects will become apparent from the description to follow which, taken with the accompanying drawing, illustrates a preferred form in which the invention may be carried into practice.

In this drawing:

Figure 1 is a side view, principally in cross section of a slip ring and brush assembly in accordance with the invention;

Fig. 2 is a left hand end elevation thereof, in the direction of the arrows 2—2;

Fig. 3 shows a cross section taken on the line 3—3 of Fig. 1; and

Fig. 4 is a somewhat enlarged detail of the novel form of bearing for the outboard end of the slip ring arbor.

Regarded generally the invention comprehends the affixation to one of the relatively rotatable frameworks or supports of a brush assembly. The slip ring arbor is carried in the other of the frameworks or supports for rotation therewith but with limited axial movement permitted. The other, or outboard end of the arbor is carried on the first mentioned rotatable support for free rotation relative to the brush assembly but restricted in an axial sense. Any tendency of the brush assembly and the slip ring assembly to shift axially due to thermal expansion or unavoidable mechanical shift from other causes is all taken on one end, namely the outboard end of the slip ring arbor, and axial alignment thereby preserved.

Turning now to the drawing I have shown a pair of relatively rotatable members 10 and 11 which may, for example, be a gimbal and a fixed framework associated with a gyroscope. It is assumed that certain electrical circuit components will be carried on one of the members 10 and 11 and that other components will be carried on the other thereof and that a plurality of conductors serve to interconnect the same. Thus, the completion of the several circuits is made the function of an organization comprising a plurality of electrically independent slip rings 13 and an equal plurality of brushes 14 in rubbing contact therewith. For ease of exposition and understanding the member 10 will be regarded as rotative and the member 11 as fixed although it will be obvious that both may rotate or that the role of the members 10 and 11 may be interchanged. In practice some form of bearing 15 will maintain proper rotative relation between the members 10 and 11.

Member 10 is provided with an aperture 21, say cylindrical, to receive with a drive fit, a correspondingly formed sleeve 22 serving as a base for the brush unit 23. If desired a key, splines or set screw may be utilized intermediate to the parts 10 and 22 although forces which might tend to disturb a light press fit may be assumed to be non-existent.

The brush assembly comprises an electrically-insulating tube 31 within which a plurality of electrically-insulating discs or wafers 32 are received in stacked relation. Each disc 32 is provided with a recess 34 on one of its flat faces within which a brush 35 may be received. Each of the discs 32 is provided with a plurality of notches transversely of the perimeter thereof in order that, when properly aligned angularly the notches together constitute a plurality of channels 36 for a purpose to be described.

Each brush 35 comprises a length of wire, e. g., Phosphor bronze, bent upon itself at one end to form a terminal loop 37 and combined with another length of wire laid parallel thereto and soldered. The two other ends are then formed as shown in Fig. 3 to provide brush fingers 41—41 bearing on opposite ends of a diameter of the associated slip ring. Obviously the bending of the fingers 41—41 may be controlled to yield the requisite rubbing contact. Each of the brushes includes an elongated straight portion retained in one of the channels 36 which, together with the surrounding sleeve 31 provides full electrical protection and physical support. The depth of the recess 34 is selected to permit freedom of flexure of the fingers 41—41 as the slip ring arbor is moved into assembled position and to avoid any tendency of a finger to move out of contact with its slip ring and there remain.

The sleeve 22 is provided with a pair of insulating rings 43—43 (Fig. 4) for a purpose to be described which are also peripherally notched at 44 in the manner of the discs 32 for passage of the brush leads 30. A flange 46 serves to abut the left hand ring 43 which, in turn, is abutted by the other ring 43 and the tube 31. Following assembly of the several parts the right hand end of the sleeve 22 is spun over, as at 51 to clamp the parts into a unitary assembly.

At its left end the sleeve 22 is provided with a flange 52 faced with an electrically insulating washer 53 which carries a plurality of terminals 54 and about which the looped end 37 of each brush is individually soldered. Terminals 54 may be U-shaped, if desired, one leg being at 54 and the other leg 55 receiving the incoming lead.

The slip ring assembly includes an arbor 61 having an enlargement or head 62 received in a complementary aperture 63 in a plate 64 attached as by screws 65 to the member 11. The fit between the head 62 and aperture 63 is one to permit free sliding therebetween but no undue radial looseness. Restraint in a rotational sense is provided by a key 66 and keyway 67 or their equivalent.

The arbor 61 includes a cylindrical portion with which the rings 13 are incorporated. Inasmuch as the precise mode of combining the rings with the arbor forms no part of the present invention per se and, moreover, may be of the character detailed in my said co-pending application elaboration thereupon will be dispensed with. It will be understood, however, that there is a ring 13 individual to each pair of brush fingers 41—41 and that, in an axial sense, the brush is centered on the ring.

The leads 71 from the several slip rings emerge from the arbor and are bent over to join terminals 72 which may be the same as terminals 54 and 55. Terminals 72 are carried in an insulating ring 73 carried on the member 11 or the plate 64. Inasmuch as the conductors 71 are of extremely small gauge they cannot, even as a group, present sufficient rigidity to neutralize the intended axial shiftability of the arbor 61.

Arbor 61 is axially tied to the brush assembly 23 by novel means now to be brought out. Secured in the left end of the arbor 61 is a stud 77 upon which are received the inner bearing races 78 and 79 (Fig. 4). Integrated in any suitable manner with the insulating rings 43—43 are the outer bearing races 81 and 82. Intermediate the four races is a plurality of balls 83 whereupon the outboard or left end of the arbor is supported for rotation but restrained against axial shift. It will be clear that a bearing so constituted may have virtually zero end play. That is to say the parts 78 may be of such thickness that the balls 83 may be locked up tight and then, by introducing a shim of appropriate thickness therebetween, a desired minimum running clearance may be provided together with minimum axial play. The shimming of parts in this manner will be understood to be well known practice. By splitting both the inner and outer races accurate adjustment of play may be accomplished by shimming both sets of races. A nut 85 locks the races 78 and 79 to the arbor 61. The purpose of utilizing four independent bearing races will now be explained in connection with assembly of the slip ring unit with the brush unit.

Assuming that the assembly 23 and rings 43—43 including the outer bearing races 81 and 82 have been locked into position between the flanges 46 and 51 the slip ring assembly including its leads 71 is placed in operative position by passing the arbor between the plurality of pairs of fingers 41—41. To facilitate such passage a bullet nosed thimble (not shown) may be placed temporarily over the entering end. Following removal of the thimble the inner race 78 is placed over the stud 77 and the balls 83 placed in position, followed by the race 79 and the nut 85 whereby the slip rings are axially aligned with their respective fingers 41—41. Any necessary minor adjustment between the rings and fingers may be effected by the use of shims between the race 78 and the arbor 61. Any adjustment in bearing and play may be accomplished by annular shims between the races 78 and 79.

During operation any factor which tends to change the axial relation between the members 10 and 11 will be ineffective to alter the predetermined alignment of the fingers 41—41 with their individual slip rings as the slip ring arbor is anchored at one end to the brush assembly. Any axial displacement between the members 10 and 11 will, in so far as concerns the slip ring and brush assembly, be evidenced as sliding movement of the part 62 in the aperture 63 and by flexing of the leads 71. Since any axial shift due to the causes mentioned is measured as only a few thousandths of an inch the flexing imparted to the leads 71 is insufficient to cause fatigue failure.

From the foregoing it will have become apparent that I have provided a multiple slip ring and brush organization in which the alignment of the rings and brushes are attended with considerable exactness and whereby I am able to virtually eliminate axial motion of the slip rings relative to the brushes arising from thermal expansion of the parts or deflection thereof under loading or accelerative forces, which provides support at both ends of the slip ring assembly thereby reducing eccentricity (i. e., runout) and raising the natural frequency of vibration thereof, and which renders it possible to assemble the slip ring assembly into the brush assembly and to adjust the same axially before securement of either part to their ultimate supports, e. g., the gimbals of a gyroscope.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

Having thus described my invention, I claim and desire to secure by Letters Patent:

I claim:

A slip ring and brush assembly for completing a plurality of electric circuits between two relatively rotatable members, comprising tubular means having a plurality of annular recesses uniformly spaced apart along the interior thereof and carried on one of said members for rotation therewith, a plurality of brushes each received in a said recess, an arbor carried by one end on the other of said members for rotation therewith and limited axial movement with respect thereto over a range not greater than the axial spacing of the brushes, said arbor having a head at said one end greater in maximum transverse dimension than the bore of the tubular means thereby preventing insertion of the arbor into the tubular means in one direction, a plurality of slip rings one individual to each brush mounted on said arbor, and anti-friction bearing means for rotatably supporting the other end of said arbor with respect to said tubular means, said bearing means including an outer race, the minimum internal diameter of said outer race and tubular means being substantially equal and said outer race having an internally-located ball groove, an inner race part carried at the said other end of said arbor and having a maximum diameter less than the internal diameter of said tubular means for free passage therethrough, a complementary inner race part abutting said first mentioned inner race part, said inner race parts together having a ball groove, a plurality of balls having a running fit in said ball grooves, the fit being such as to provide rotational support and axial fixity, and means for securing said inner race parts to said arbor.

References Cited in the file of this patent

UNITED STATES PATENTS

| | | |
|---|---|---|
| 2,119,168 | Kus | May 31, 1938 |
| 2,509,931 | Krantz | May 30, 1950 |
| 2,759,243 | Smith | Aug. 21, 1956 |

FOREIGN PATENTS

| | | |
|---|---|---|
| 110,942 | Sweden | June 20, 1944 |
| 317,313 | Germany | Dec. 17, 1919 |